United States Patent
Dunsmore

(10) Patent No.: US 9,595,986 B2
(45) Date of Patent: Mar. 14, 2017

(54) METHOD AND SYSTEM FOR EXTENDING DYNAMIC RANGE OF RECEIVER BY COMPENSATING FOR NON-LINEAR DISTORTION

(71) Applicant: Keysight Technologies, Inc., Minneapolis, MN (US)

(72) Inventor: Joel P. Dunsmore, Sebastopol, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/831,454

(22) Filed: Aug. 20, 2015

(65) Prior Publication Data

US 2016/0087660 A1    Mar. 24, 2016

Related U.S. Application Data

(60) Provisional application No. 62/053,127, filed on Sep. 20, 2014.

(51) Int. Cl.
| | | |
|---|---|---|
| H04B 17/00 | (2015.01) | |
| H04B 1/10 | (2006.01) | |
| H04B 17/17 | (2015.01) | |
| H04B 17/21 | (2015.01) | |

(52) U.S. Cl.
CPC ........... H04B 1/1027 (2013.01); H04B 17/17 (2015.01); H04B 17/21 (2015.01)

(58) Field of Classification Search
CPC .............. G01R 27/28; G01R 31/31908; G01R 31/3191; H04B 17/21

USPC ........ 455/67.11, 423, 226.1, 67.16; 702/106, 702/85
See application file for complete search history.

(56) References Cited

U.S. PATENT DOCUMENTS

| | | | | |
|---|---|---|---|---|
| 5,117,377 A | * | 5/1992 | Finman | G01S 7/4004 333/103 |
| 5,758,273 A | * | 5/1998 | Marks | H04B 1/109 455/234.2 |
| 5,978,665 A | * | 11/1999 | Kim | H04B 17/318 455/249.1 |
| 6,252,536 B1 | * | 6/2001 | Johnson | H03M 1/187 330/253 |
| 7,231,308 B2 | | 6/2007 | Dunsmore et al. | |
| 8,155,904 B2 | | 4/2012 | Dvorak et al. | |

(Continued)

OTHER PUBLICATIONS

Wendy Van Moer et al., "Calibration of a Wideband IF Nonlinear Vectorial Network Analyser," ARFTG Conference Digest-Spring, 53rd, Year: 1999, vol. 35, pp. 1-6.

(Continued)

*Primary Examiner* — Sonny Trinh

(57) ABSTRACT

A method is provided for extending dynamic range of a receiver. The method includes receiving a known input signal at the receiver, detecting a first output signal in response to the known input signal, and determining a correction function based on the first output signal and the known input signal for compensating for non-linear distortion introduced by the receiver. The method further includes receiving an unknown input signal at the receiver, detecting a second output signal in response to the unknown input signal, and applying the correction function to the second output signal in a time domain to recover the unknown input signal.

20 Claims, 7 Drawing Sheets

(56) References Cited

U.S. PATENT DOCUMENTS

| | | |
|---|---|---|
| 8,718,586 B2 | 5/2014 | Martens et al. |
| 2012/0082251 A1 | 4/2012 | Vanden Bossche |
| 2013/0197848 A1 | 8/2013 | Sariaslani et al. |
| 2014/0368216 A1* | 12/2014 | Pailloncy ............... G01R 25/00 324/602 |

OTHER PUBLICATIONS

João Paulo Martins et al., "Multitone Phase and Amplitude Measurement for Nonlinear Device Characterization," IEEE Transactions on Microwave Theory and Techniques, vol. 53, No. 6, Jun. 2005, pp. 1-8.

\* cited by examiner

METHOD AND SYSTEM FOR EXTENDING DYNAMIC RANGE OF RECEIVER BY COMPENSATING FOR NON-LINEAR DISTORTION

PRIORITY

The present application claims priority under 35 U.S.C. §119(e) from commonly owned U.S. Provisional Application No. 62/053,127, filed on Sep. 20, 2014, to J. Dunsmore. The entire disclosure of U.S. Provisional Application No. 62/053,127 is specifically incorporated herein by reference.

BACKGROUND

The dynamic range of a radio frequency (RF) receiver is typically limited by the noise floor of the RF receiver and the maximum signal that can be received without distortion. In certain measurements of signals output by a device under test (DUT), for example, such as Third Order Intermodulation (TOI) or Adjacent Channel Power Ratio (ACPR), the quantity of interest is the level of distortion present in the measured signal created by the DUT, and the quality of the measurement of an unknown device or signal is limited by the distortion created in the measuring receiver. Often, the distortion of the measuring receiver is larger than the distortion of the DUT signal. Conventional solutions for improving the distortion include adding attenuation in front of the receiver to reduce the maximum power of the DUT to such a level that the receiver distortion is significantly below that of the DUT signal. However, adding attenuation degrades the receiver noise figure, which may result in the DUT signal to be measured dropping below the noise floor of the receiver.

In a vector network analyzer (VNA), the upper limitation has been extended through use of gain compression compensation, as described for example in U.S. Pat. No. 7,231,308, "Test system dynamic range extension through compression compensation." More particularly, U.S. Pat. No. 7,231,308 discloses a method to compensate for gain compression of the receiver through post processing the filtered data from the VNA receiver, which is created using an analog-to-digital converter (ADC) to sample the signal and a digital filter to extract magnitude and phase of the signal. While this method may be applied to single tone, continuous wave (CW) signals in a receiver, it does not provide compensation for multi-tone or wideband signals, in which several CW signals are present in the receiver at one time.

Thus, pre-distortion techniques for linearization of transmitters (e.g., DUTs) have been used for years, e.g., in the wireless base-station industry, to improve overall distortion performance of high power amplifiers. Receiver linearization correction, discussed above, has been successfully applied, for example to achieve improvement in gain compression performance. However, this implementation applies only to CW signals which occur on processed ADC readings, after decimation, filtering and detection. There is therefore a need for post-detection linearization techniques of the ADC output.

SUMMARY

In a representative embodiment, a method is provided for extending dynamic range of a receiver. The method includes receiving a known input signal at the receiver; detecting a first output signal in response to the known input signal; determining a correction function based on the first output signal and the known input signal for compensating for non-linear distortion introduced by the receiver; receiving an unknown input signal at the receiver; detecting a second output signal in response to the unknown input signal; and applying the correction function to the second output signal in a time domain to recover the unknown input signal.

In another representative embodiment, a method is provided for extending dynamic range of a receiver in a vector network analyzer (VNA). The method includes characterizing the receiver using a known input signal having at least one tone and a first output signal in response to the known input signal to identify non-linear distortion of the known input signal introduced by the receiver; creating a mapping function that maps the first output signal to the known input signal based on the characterization of the receiver; and receiving an unknown input signal from a DUT having multiple tones; and applying the mapping function in a time domain to a second output signal detected in response to the unknown input signal to recover an actual input signal corresponding to the unknown input signal.

In another representative embodiment, a test system having extended dynamic range includes a receiver and a processing unit. The receiver is configured to receive a known input signal and to detect a first output signal corresponding to the known input signal. The processing unit is configured to execute a computer program implementing instructions for determining a correction function based on the first output signal and the known input signal for compensating for non-linear distortion introduced by the receiver. The receiver subsequently receives an unknown input signal from a device under test (DUT), the unknown input signal comprising a multi-tone signal or a modulated wide bandwidth signal, and detects a corresponding second output signal. The processing unit applies the correction function to the second output signal in a time domain to reconstruct the unknown input signal.

BRIEF DESCRIPTION OF THE DRAWINGS

The representative embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Various representative embodiments generally provide a method to overcome the limitations of CW signals by performing decompression on an RF waveform or on an intermediate frequency (IF) waveform, which for many cases of intermodulation distortion (IMD) and modulated signals, contains a complete image of the RF waveform, including a multi-tone signal or a (full-bandwidth) modulated wide bandwidth signal. The disclosed method and system may be used by wideband receivers to capture modulated or complex signals.

Figure 1:
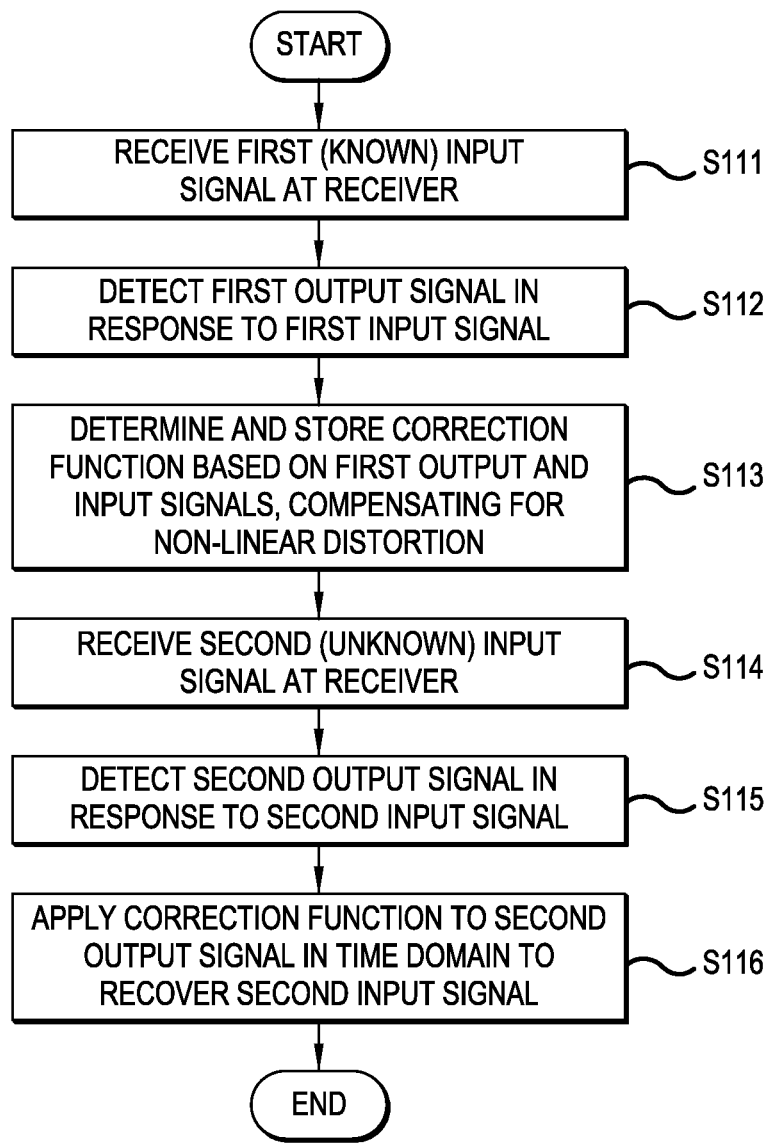
FIG. 1 is a flow diagram showing a method of extending dynamic range of a receiver, according to a representative embodiment.

FIG. 1 is a flow diagram showing a method for extending dynamic range of a receiver using a non-linear model. The receiver may be a receiver in a spectrum analyzer (single channel receiver) or one or more receivers in vector network analyzer (VNA) (multi-channel receiver), for example, as discussed below with reference to FIG. 2.

Referring to FIG. 1, the method includes receiving a first (known) input signal at the receiver at block S111. The known input signal may be an RF signal, for example, generated by a known signal source. For example, in the case of a VNA, the signal source may be internal to the VNA, along with the receiver, enabling the known input signal to be provided to the receiver via an internal transmission line. The known input signal has least one tone. At block S112, a first output signal, with non-linear distortion due to the receiver, is detected by the receiver in response to the known input signal.

In block S113, a correction function is determined by a processing unit based on the first output signal and the known input signal for compensating for the non-linear distortion introduced into the input signal by the receiver, and stored in a memory for future access. The correction function is determined in the time-domain, and therefore covers multiple frequencies, such as a known input signal that is a multi-tone signal or a modulated wide bandwidth signal (e.g., including a full-bandwidth modulated wide bandwidth signal). To accommodate this, the first output signal is detected in the time domain. Alternatively, the correction function may be optimized to minimize the non-linear distortion of the first output signal by detecting the first output signal in a frequency domain, and then converting to the time domain by applying a Fourier transform (FT), such as a fast Fourier transform (FFT), using the processing unit. The correction function, which may also be referred to as a mapping function, characterizes the receiver to enable recovery of the known input signal. That is, the correction function maps the detected first output signal to the known input signal based on the characterization of the receiver.

Determining the correction function for characterizing the receiver may be accomplished through application of a number of techniques, without departing from the scope of the present teachings. For example, determining the correction function may include determining an error signal from the known input signal and the detected first output signal, and fitting the determined error signal to a polynomial curve (or other curve fit). In an embodiment, optimization may be performed by adding optimizing values of the polynomial by converting a second output signal (discussed below) into the frequency domain and minimizing the (non-linear) distortion products. Alternatively, determining the correction function may include plotting values of the first output signal against corresponding values of the known input signal in the time domain to develop a characteristic curve of the receiver.

The curve fitting may include, for example, determining gain factor of the receiver from the known input signal and the measured first output signal, and multiplying the time waveform of the first output signal by the gain factor to create a gain compensated output waveform. The gain compensated output waveform is subtracted from the waveform of the known input signal to obtain an error signal. The error signal is mapped to the known input signal, where the error signal is the dependent variable and the known input signal is the independent variable. Using well-known techniques, an optimized curve fitting function is determined for the known input signal that substantially approximates the error signal. The correction function is applied by scaling the measured first output signal by correction function. A residual error may be determined by comparing the correction first output waveform to the known input waveform, or by comparing a corrected output spectrum of the first output signal (in the frequency domain) to the input spectrum of the known input signal. The factors used in curve fitting may be optimized to minimize the residual error. These factors are well known including, but not limited to, order of a polynomial fitting curve, coefficients of a polynomial fitting curve, and values of a look-up table and factors.

In block S114, a second (unknown) input signal is received at the receiver. The second input signal may be a test output signal provided by a device under test (DUT) in response to a stimulus signal (e.g., which may be the same as the known input signal generated by the signal source). The unknown input signal may have multiple tones, even in the case where the known input signal has only one tone. A second output signal is detected by the previously characterized receiver in response to the second input signal in block S115. Again, the second output signal may be detected in the time domain, or may be detected in the frequency domain and converted to the time domain by an FT application. In block S116, the correction function determined in block S213 is applied to the second output signal in the time domain to recover (or reconstruct) the unknown input signal. For example, recovery or reconstruction of the unknown input signal provides the test output signal of the DUT responsive to the stimulus signal. That is, the correction function (or mapping function) is applied in the time domain to the second output signal detected in response to the unknown input signal to recover the actual input signal corresponding to the previously unknown input signal, removing non-linear distortion introduced by the receiver while detecting the second output signal. In other words, the correction function provides a non-linear model of the receiver. By removing the non-linear distortion, the dynamic range of the receiver is effectively extended. Like the first (known) input signal, the second (unknown) input signal may be a single-tone or multi-tone signal or a modulated wide bandwidth signal. Thus, each of the first output signal and the second output signal is detected at multiple different frequencies. However, because the correction function is determined and applied in the time domain, the removal of non-linear distortion is not limited to any particular frequency.

Figure 2:
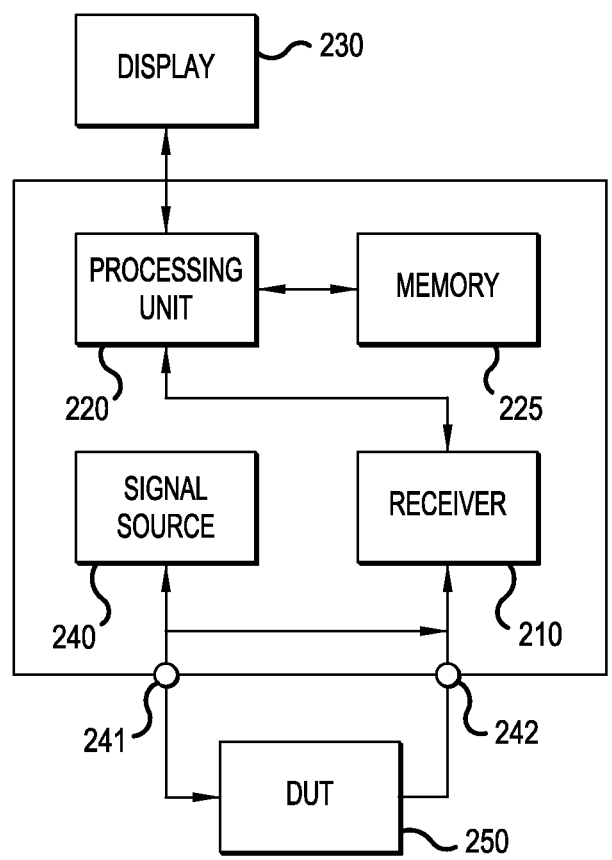
FIG. 2 is a simplified block diagram of a test system including a receiver with extended dynamic range using a non-linear model, according to a representative embodiment.

FIG. 2 is a simplified block diagram of a test system including a receiver with extended dynamic range using a non-linear model, according to a representative embodiment.

Referring to FIG. 2, test system 200 is in the form of a VNA, such as an N523xA PNA-L Series or N524xA PNA-X Series VNA, available from Agilent Technologies, Inc., for example, although other types of test system (or measuring devices) may be incorporated without departing from the scope of the present teachings. The test system 200 is configured for measuring magnitude and phase response of a device under test (DUT) 250. More particularly, the test system 200 includes a receiver 210 having a corresponding receiver channel, a processing unit (or controller) 220, a memory 225, and a display 230. The memory 225 may store a computer program executable by the processing unit 220 of the test system 200. For example, in executing the computer program, the processing unit 220 may cause performance of the various steps in the method described above with reference to FIG. 1. Although a single receiver is shown (receiver 210), it is understood that the test system 200 may include multiple receivers with corresponding receiver channels.

The test system 200 further includes a signal source 240, as well as a first test port 241 and a second test port 242. The signal source 240 may be an RF signal source, for example, and is connected to the receiver 210 and to the first test port 241. The second test port 242 is connected to the receiver 210. The DUT 250 is connected between the first and second test ports 241 and 242 during a test, e.g., to measure magnitude and phase data for the DUT 250. In alternative embodiments, the signal source 240 may be outside the test system 200, without departing from the scope of the present teachings.

During such a test, a first (known) input signal generated by the signal source 240 is applied to the receiver 210, which detects a first output signal in response. The known input signal may be a multi-tone signal or a modulated wide bandwidth signal, for example. The processing unit 220 compares the detected first output signal with the original known input single, which differ from one another due to non-linear distortion (e.g., magnitude and phase compensation due to gain compression effects) introduced by the receiver 210, and determines a correction function to compensate for the non-linear distortion. The correction function is stored in memory, such as memory 225, for future access. In an embodiment, the correction function may be determined and stored in the memory 225 during factory calibration, e.g., as part of the manufacturing process of the test system 200.

Also, in alternative embodiments, the signal source 240 may come directly from the DUT 250, in an attenuated form that does not create distortion in the receiver 210, using a known attenuation. The signal generated by such a signal source 240 is measured and becomes the known input signal in the receiver 210, when the attenuation is removed. Since the correction function depends mostly on the large signal response, it is possible to measure the distortion of the receiver 210 using the DUT 250 output if the DUT distortion is significantly lower than the receiver distortion.

As discussed above, the correction function is determined in the time-domain, and therefore covers multiple frequencies. Accordingly, the first output signal is detected by the receiver 210 in the time domain, or is detected by the receiver 210 in the frequency domain and converted to the time domain by the processing unit 220 applying an FT. The correction function characterizes the receiver 210 to enable recovery of the known input signal. That is, the correction function maps the detected first output signal to the known input signal based on the characterization of the receiver. Examples of determining the correction function are discussed above with reference to block S113 in FIG. 1.

The signal source 240 then generates a stimulus signal that is provided to an input of the DUT 250 via the first test port 241. The stimulus signal may be the same as or different form the known input signal previously provided to the receiver 210 for determination of the correction function. The DUT 250 outputs a test output signal in response to the stimulus signal. The test output signal is provided input to the receiver 210 as a second (unknown) input signal via the second test port 242. The receiver 210 detects a second output signal. As mentioned above, the receiver 210 may detect the second output signal in the time domain, or in the frequency domain for subsequent conversion to the time domain by the processing unit 220.

The processing unit 220 then applies the previously determined correction function, characterizing the receiver 210, to the second output signal in the time domain in order to remove the non-linear distortion introduced by the receiver 210 while detecting the second output signal. Accordingly, the processing unit 220 is able to recover the second input signal (i.e., map the second output signal to the actual test output signal output by the DUT 250). The processing unit 220 is then able to characterize the DUT 250 by comparing the recovered second input signal with the stimulus signal. As mentioned above, each of the first (known) input signal, the second (unknown) input signal received by the receiver 210 may be a multi-tone signal or a modulated wide bandwidth signal, for example. Thus, each of the first output signal and the second output signal is detected at multiple different frequencies, and because the correction function is determined and applied in the time domain, the removal of non-linear distortion is performed at the multiple different frequencies.

As mentioned above, the processing unit 220 performs the various steps of characterizing the receiver 210, recovering the test output signal output by the DUT 250 by compensating for non-linear distortion of the receiver 210, and characterizing the DUT 250 by implementing instructions of the computer program stored in the memory 225. The processing unit 220 is also configured to control additional overall operations of the test system 200, and may be included in the test system 200 (as shown) or may be a separate device, such as a personal computer (PC).

Generally, the processing unit 220 may be implemented by a computer processor (e.g., of a PC or dedicated workstation), application specific integrated circuits (ASICs), field-programmable gate arrays (FPGAs), or combinations thereof, using software, firmware, hard-wired logic circuits, or combinations thereof. A computer processor, in particular, may be constructed of any combination of hardware, firmware or software architectures, and may include memory (e.g., volatile and/or nonvolatile memory) for storing executable software/firmware executable code that allows it to perform the various functions. In an embodiment, the computer processor may comprise a central processing unit (CPU), for example, executing an operating system. The processing unit 220 may include a storage device (e.g., memory 225), such as random access memory (RAM), read-only memory (ROM), flash memory, electrically programmable ROM (EPROM), electrically erasable programmable ROM (EEPROM), hard disk drive (HDD), or the like. Data from various measurements and characterizations of the DUT 250 may be displayed on the display 230 and/or stored in the memory 225 for analysis, for example. A user input/output interface (not shown) may be included with the processing unit 220 for a user to control operations and/or view data and computation results of the test system 200.

Figure 3:
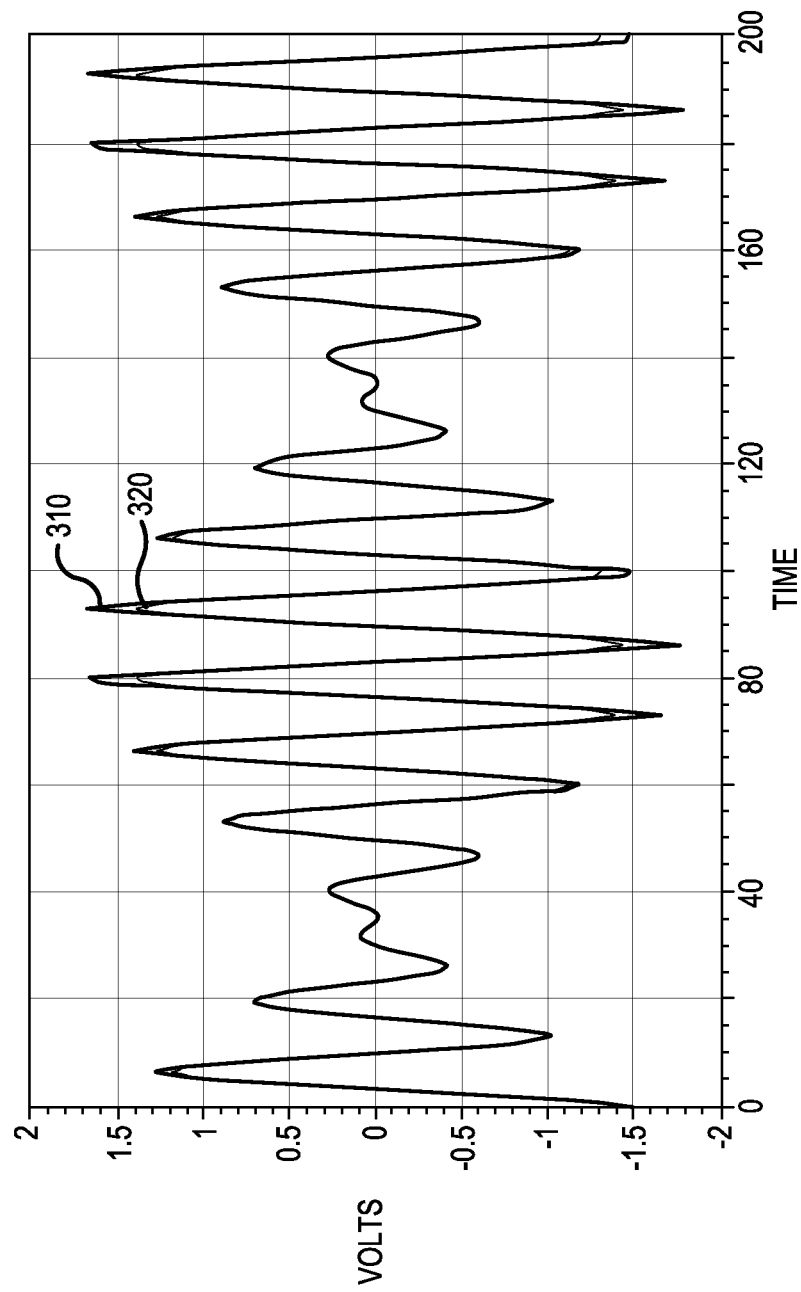
FIG. 3 shows traces corresponding to a known input signal received by a receiver and a corresponding (distorted) first output signal of the receiver, for purposes of comparison.

FIG. 3 shows traces 310 and 320, which respectively correspond to a known input signal received by a receiver and a corresponding (distorted) first output signal of the receiver, for purposes of comparison. The x-axis indicates time and the y-axis indicates voltage. The time scale is arbitrary (e.g., nsec*10), and the voltage may be an ADC sample number (e.g., ADC sample rate of 10 nsec.), which is scaled ADC readings representing voltage. The known input signal and the first output signal are in the time domain, and in the depicted example, are two-tone signals. The distorted first output signal is scaled by comparing the small signal response (gain) of the receiver.

Figure 4:
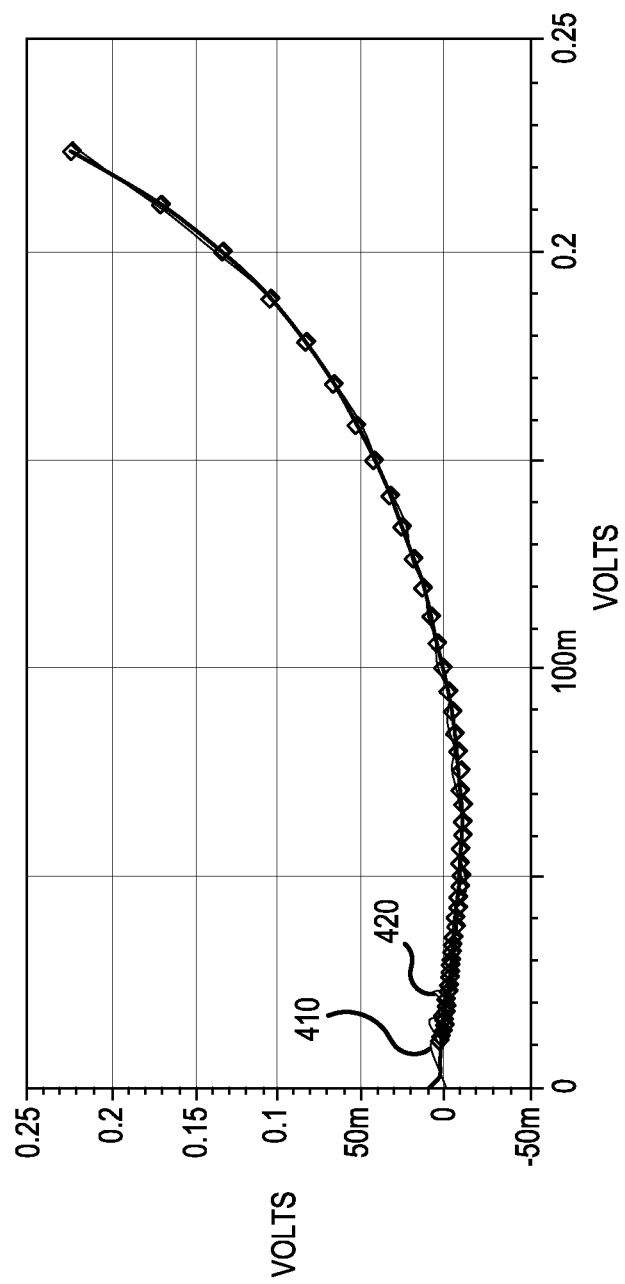
FIG. 4 shows traces corresponding to an error signal and a corresponding correction function determined in response to an error function for compensating for non-linear distortion of a receiver, according to a representative embodiment.

FIG. 4 shows trace 410, which corresponds to an error signal plotted with the x-axis being the value of the measured first output signal time waveform and the y-axis being the value of the error function. That is, the x-axis indicates voltage of the first output signal and the y-axis indicates voltage of the error function. Here, the error signal is the difference between the known input signal and the scaled first output signal. Trace 420 corresponds to the correction function (or curve fit) determined in response to the error function for compensating for the distortion introduced into the input signal by the receiver.

Figure 5:
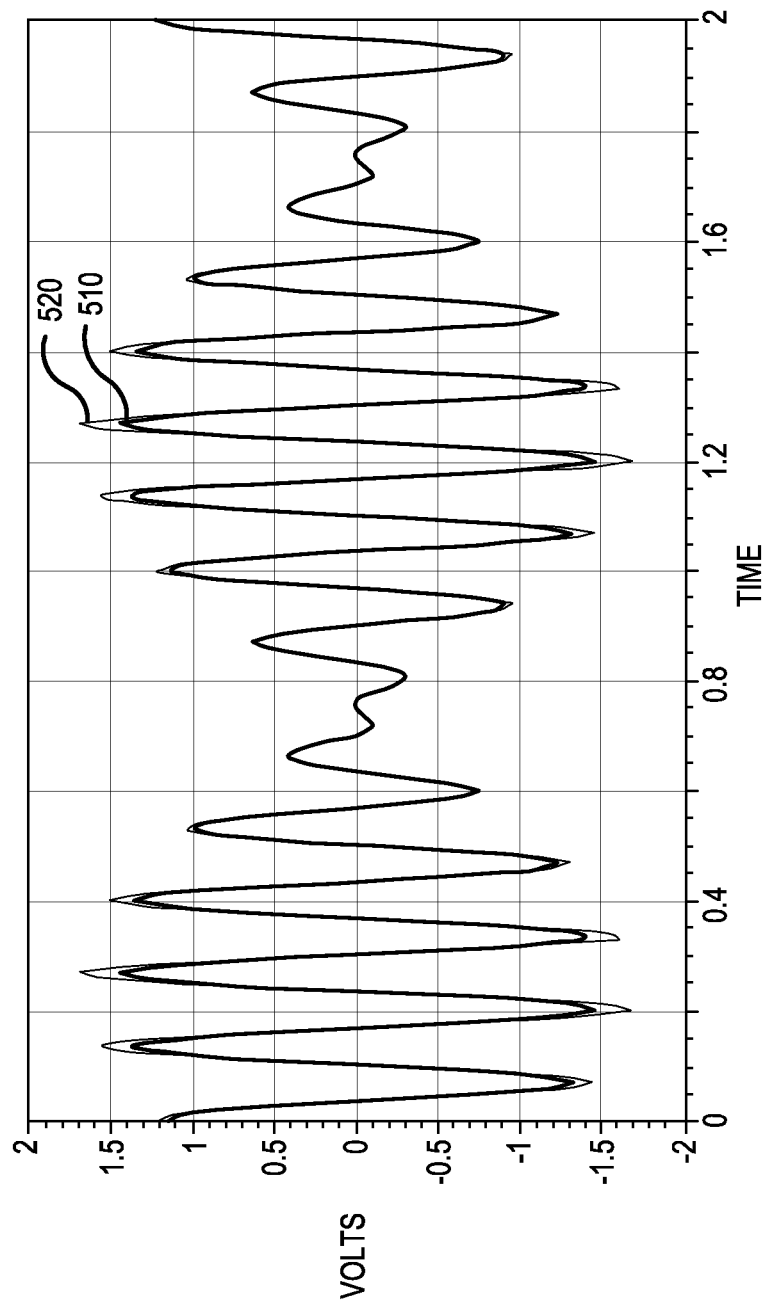
FIG. 5 shows traces corresponding to a distorted first output signal and a compensated first output signal, according to a representative embodiment.

FIG. 5 shows traces 510 and 520, which respectively correspond to the distorted first output signal and the compensated (or corrected) first output signal, for purposes of comparison. The x-axis indicates time and the y-axis indicates voltage, as discussed above. At each time index, the measured value of the distorted first output signal is used to determine a correction factor, which when applied to the distorted first output signal yields the compensated first output signal, according to representative embodiments described herein. The distorted and compensated first output signals are two-tone signals. Also, in the example, the distorted first output signal (trace 510) may correspond to the distorted first output signal (trace 320) shown in FIG. 3.

Figure 6:
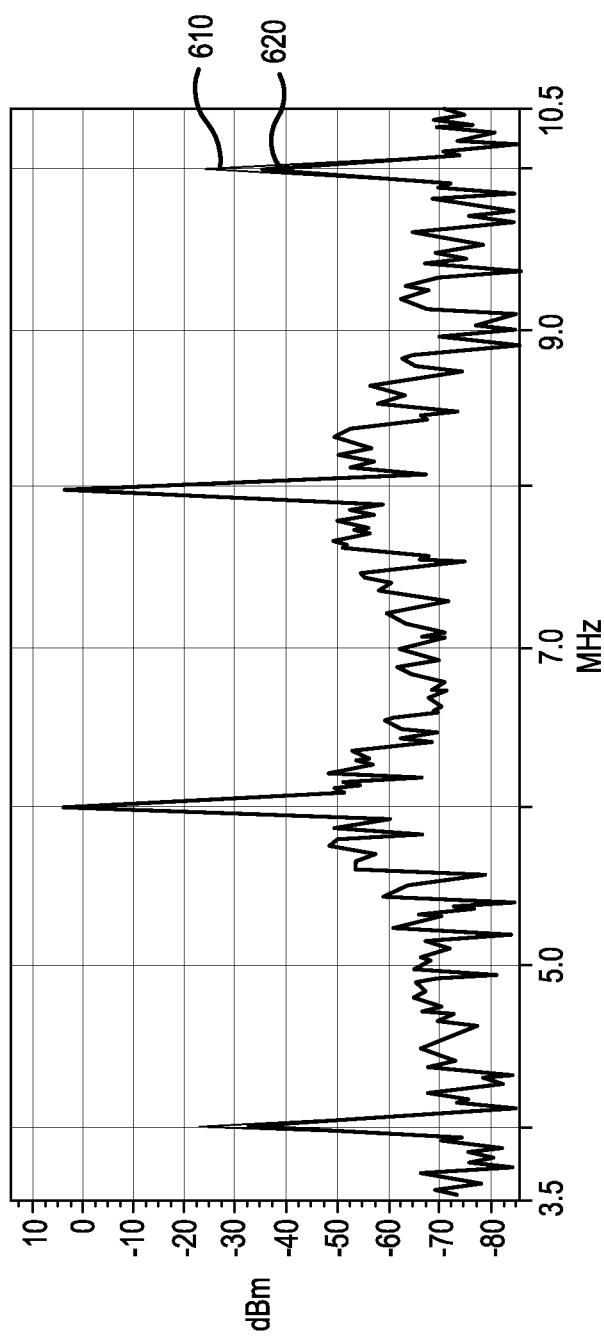
FIG. 6 shows traces corresponding to spectrums of a distorted first output signal and a compensated first output signal, according to a representative embodiment.

FIG. 6 shows traces 610 and 620, which respectively correspond to spectrums of the second output signal (from a received unknown input signal) and the compensated (or corrected) second output signal, for purposes of comparison. The x-axis indicates frequency in MHz and the y-axis indicates power in dBm. The compensated second output signal (trace 620) essentially reveals the true nature of distortion in the unknown second output signal (traces 610). That is, trace 620 is the second output signal that represents the true unknown input signal received by the receiver. The distorted and compensated second output signals are two-tone signals. As shown, the distorted second output signal has high levels of Third-Order Intermodulation (TOI), while the level in the compensated second output signal is about 10 dB less, indicating a significant improvement.

Figure 7:
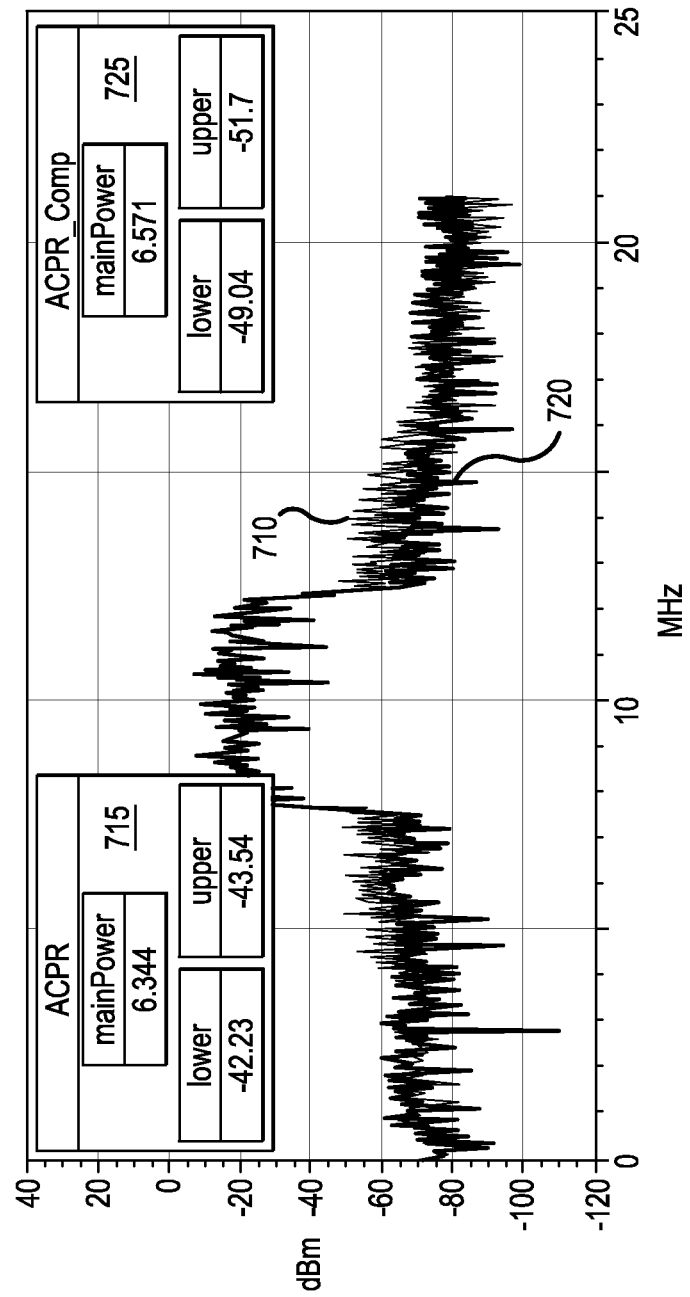
FIG. 7 shows traces corresponding to a distorted first output signal and a compensated first output signal, according to a representative embodiment, and corresponding Adjacent Channel Power Ratios (ACPRs).

FIG. 7 shows measured responses of modulated signals, with Adjacent Channel Power distortion computed. That is, traces 710 and 720 respectively correspond to the distorted second output signal and the compensated (or corrected) second output signal, for purposes of comparison, as discussed above. That is, trace 720 is the second output signal that represents the true unknown input signal received by the receiver. The x-axis indicates frequency in MHz and the y-axis indicates power in dBm. Table 715 shows the ACPR of the distorted second output signal (trace 710), and Table 725 shows the ACPR of the corrected second output signal (trace 720), after compensation according to representative embodiments described herein. The spectrum for both the distorted and corrected second output signals are plotted with the corrected output signal (trace 720) showing the same level of main signal and significantly less ACPR levels, thus demonstrating the effectiveness of the compensation.

One of ordinary skill in the art appreciates that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

What is claimed is:

1. A method for extending dynamic range of a receiver, the method comprising:
   receiving a known input signal at the receiver;
   detecting a first output signal in response to the known input signal;
   determining a correction function based on the first output signal and the known input signal for compensating for non-linear distortion introduced by the receiver, the correction function being determined in a time domain;
   receiving an unknown input signal at the receiver;
   detecting a second output signal in response to the unknown input signal; and
   applying the correction function to the second output signal in the time domain to recover the unknown input signal.

2. The method of claim 1, wherein the known input signal is a multi-tone signal or a modulated wide bandwidth signal.

3. The method of claim 2, wherein the unknown input signal is a multi-tone signal or a modulated wide bandwidth signal.

4. The method of claim 1, wherein each of the first output signal and the second output signal is detected at a plurality of different frequencies.

5. The method of claim 1, wherein the unknown input signal is received from a device under test (DUT).

6. The method of claim 1, wherein each of the first output signal and the second output signal is detected in the time domain.

7. The method of claim 1, wherein each of the first output signal and the second output signal is detected in the frequency domain.

8. The method of claim 1, wherein determining the correction function comprises determining an error signal from the known input signal and the first output signal, and fitting the determined error signal to a polynomial curve.

9. The method of claim 1, wherein determining the correction function comprises plotting values of the first output signal against corresponding values of the known input signal in the time domain to develop a characteristic curve of the receiver.

10. A method for extending dynamic range of a receiver in a vector network analyzer (VNA), the method comprising:
characterizing the receiver using a known input signal having at least one tone and a first output signal in response to the known input signal to identify non-linear distortion of the known input signal introduced by the receiver;
creating a mapping function that maps the first output signal to the known input signal based on the characterization of the receiver;
receiving an unknown input signal from a device under test having a plurality of tones; and
applying the mapping function in a time domain to a second output signal detected in response to the unknown input signal to recover an actual input signal corresponding to the unknown input signal.

11. The method of claim 10, further comprising:
optimizing the mapping function to minimize the non-linear distortion of the first output signal by detecting the first output signal in a frequency domain.

12. The method of claim 10, wherein each of the first and second output signals is detected at a plurality of frequencies.

13. A test system having extended dynamic range, comprising:
a receiver configured to receive a known input signal and to detect a first output signal corresponding to the known input signal; and
a processing unit configured to determine a correction function based on the first output signal and the known input signal for compensating for non-linear distortion introduced by the receiver,
wherein the receiver subsequently receives an unknown input signal from a device under test (DUT), the unknown input signal comprising a multi-tone signal or a modulated wide bandwidth signal, and detects a corresponding second output signal, and
wherein the processing unit is further configured to apply the correction function to the second output signal in a time domain to reconstruct the unknown input signal.

14. The system of claim 13, wherein the known input signal comprises a multi-tone signal or a modulated wide bandwidth signal.

15. The system of claim 14, further comprising:
a signal source configured to generate the known input signal provided to the receiver, and to generate a stimulus signal provided to the DUT, the DUT outputting the unknown input signal in response to the stimulus signal.

16. The system of claim 13, wherein the receiver detects each of the first output signal and the second output signal in the time domain.

17. The system of claim 13, wherein the receiver detects each of the first output signal and the second output signal in a frequency domain, and the processing unit converts each of the first output signal and the second output signal to the time domain for determining and applying the correction function, respectively.

18. The system of claim 17, wherein the receiver detects each of the first output signal and the second output signal at a plurality of frequencies.

19. The system of claim 17, wherein the processing unit converts the first output signal to the time domain for determining the correction function based on the first output signal and the known input signal.

20. The system of claim 17, wherein the processing unit converts the second output signal to the time domain for applying the correction function.

* * * * *